United States Patent
Hollingsæter et al.

(10) Patent No.: US 9,638,375 B2
(45) Date of Patent: May 2, 2017

(54) ARRANGEMENT FOR SAND COLLECTION

(75) Inventors: Terje Hollingsæter, Lommedalen (NO); Rune Fantoft, Huissen GS (NL)

(73) Assignee: FMC Kongsberg Subsea AS, Kongsberg (NO)

(*) Notice: Subject to any disclaimer, the term of this patent is extended or adjusted under 35 U.S.C. 154(b) by 373 days.

(21) Appl. No.: 14/238,460

(22) PCT Filed: Sep. 2, 2011

(86) PCT No.: PCT/EP2011/065193
§ 371 (c)(1),
(2), (4) Date: Jul. 17, 2014

(87) PCT Pub. No.: WO2013/029685
PCT Pub. Date: Mar. 7, 2013

(65) Prior Publication Data
US 2014/0318644 A1    Oct. 30, 2014

(51) Int. Cl.
*B01D 21/02*    (2006.01)
*F17D 1/08*    (2006.01)
(Continued)

(52) U.S. Cl.
CPC ......... *F17D 1/088* (2013.01); *B01D 21/0093* (2013.01); *E21B 21/065* (2013.01);
(Continued)

(58) Field of Classification Search
CPC  B01D 21/0093; B01D 21/02; B01D 21/2461; B01D 21/2472; B01D 21/34;
(Continued)

(56) References Cited

U.S. PATENT DOCUMENTS 6,119,779 A * 9/2000 Gipson ................... E21B 43/40
                                                  166/267
6,350,375 B1 * 2/2002 Bringedal .............. B01D 21/10
                                                  210/170.01
(Continued)

FOREIGN PATENT DOCUMENTS

GB    2 342 057 A    4/2000
WO    03/041838 A1    5/2003
WO    WO 2004/003335 A2    1/2004

OTHER PUBLICATIONS

C.H. Rawlins, S.E. Staten and I.I. Wang, "Design and Installation of a Sand Separation and Handling System for a Gulf of Mexico Oil Production Facility", Society of Petroleum Engineers, SPE 63041 (Oct. 1, 2000).

*Primary Examiner* — Christopher Upton

(57) ABSTRACT

The present invention regards a subsea sand handling system for limiting abrasion of specific subsea equipment (5), comprising an inlet (10) connectable to a sand separation system (2) upstream of the specific equipment (5) and an outlet (18, 22) connectable to a pipeline (6) downstream of the specific equipment (5), wherein it comprises at least two collection vessels (11,14) and means for flushing (16,17,19, 21) the sand out of at least one of the collection vessels (11,14), and the vessels (11,14) and the means for flushing (16,17,19,21) the sand out of said vessels (11,14) are configured such that sand is flushed from one vessel (11,14) while sand is collected in the other vessel (14,11). The present invention also regards a method for limiting abrasion of subsea rotating equipment.

15 Claims, 3 Drawing Sheets

(51) Int. Cl.
*B01D 21/00* (2006.01)
*E21B 43/36* (2006.01)
*E21B 21/06* (2006.01)
*F17D 3/01* (2006.01)
*B01D 21/34* (2006.01)

(52) U.S. Cl.
CPC ............... *E21B 43/36* (2013.01); *F17D 3/01* (2013.01); *B01D 21/02* (2013.01); *B01D 21/34* (2013.01); *Y10T 137/8013* (2015.04)

(58) Field of Classification Search
CPC ...... E21B 21/063; E21B 21/065; E21B 43/34; E21B 43/36; F17D 1/088
USPC ....... 210/747.1, 803, 170.01, 533, 534, 535, 210/536, 537; 166/75.12, 267, 357
See application file for complete search history.

(56) References Cited

U.S. PATENT DOCUMENTS

| | | | | |
|---|---|---|---|---|
| 6,656,366 B1* | 12/2003 | Fung | ................. | E21B 43/36 210/194 |
| 2003/0168391 A1* | 9/2003 | Tveiten | ................. | B01D 21/34 210/188 |
| 2008/0190291 A1* | 8/2008 | Krehbiel | ................. | E21B 43/36 95/241 |
| 2010/0193414 A1* | 8/2010 | Arefjord | ................. | E21B 43/36 210/170.11 |
| 2011/0036239 A1* | 2/2011 | Sarshar | ............. | B01D 21/0093 95/259 |

* cited by examiner

ARRANGEMENT FOR SAND COLLECTION

BACKGROUND OF THE INVENTION

The present invention regards a sand handling system and a method for handling sand.

Sand through rotating equipment should generally be avoided as it reduces the performance of the equipment and will in many cases cause early failure. This issue can be solved by selecting more robust materials for the pump internals but it only prolongs the pump runlife for a limited period of time. Hence, if sand can be prevented from entering the pump it will have a significant impact on pump runlife.

In onshore applications one may separate the sand from a production stream and relatively easily handle the sand. In subsea applications the handling of sand separated out from a well stream is not easy. One may not discharge the sand to the surroundings as this would lead to pollution, which should be avoided. The sand must be handled. There are several earlier proposals for the removal of sand in a well stream. In one proposal the sand is accumulated in the separation tank and periodically flushed from tank downstream of the pump. Such a solution would affect the well stream in periods, giving periods with large quantities of sand and other periods with small quantities of sand, which is not desirable. In another proposal a retrievable sand tank is used. This is designed to be retrieved to the surface when full. Retrieving the sand tank, however, is becoming more difficult as the water depths are increasing.

WO 2004/003335 A1 discloses an underwater system having a hydro-cyclone for separating sand from seawater, and a pump downstream from the hydro-cyclone for drawing seawater upstream of the hydro-cyclone into the hydro-cyclone. The sand separated from the seawater is collected in a sand storage device below the hydro-cyclone. The pump pumps the seawater from which the sand has been removed into a water injection well and a portion of the seawater is diverted into a sand extraction device beneath the sand storage device to flush away the sand collected therein.

WO 03/041838 A1 is concerned with a method and apparatus for collecting and then disposing of sand contained in production fluid where the production mixture is directed through a sand removal unit having a retrievable module installed in a modular seabed processing system, in which the unit collects sand from the mixture. The production fluid mixture then enters a fluid separation chamber in the module, where it is separated into a gas and a mixture of oil and water. Seawater is drawn in from outside the module and is pumped into the sand removal unit to flush the collected sand. The mixed flushed sand and seawater is commingled with the mixture of oil and water downstream of the fluid separation chamber and the commingled mixture is conveyed to a host facility. There, the sand is separated from the commingled mixture and disposed of.

C. H. Rawlins, Kvaerner Process Systems; S. E. Staten, Chevron USA Production Company; I. I. Wang, Kvaerner Process Systems: "Design and Installation of a Sand Separation and Handling System for a Gulf of Mexico Oil Production Facility", Society of Petroleum Engineers, and GB 2 342 057 A are also concerned with the separation of sand from a well stream.

An aim with the present invention is to provide a subsea sand handling system which alleviates some of the problems associated with the known systems. This is achieved with a system and method as defined in the attached claims.

SUMMARY OF THE INVENTION

The invention regards a subsea sand handling system for limiting abrasion of specific subsea equipment. The handling system comprises an inlet connectable to a sand separation system upstream of the specific equipment and an outlet connectable to a pipeline downstream of the specific equipment. There are several known systems for separating sand out of a wellstream. The present invention will work well with different kinds of sand separation systems. The specific equipment would normally be rotating equipment such as a pump, but could also be other kinds of subsea equipment which should be prevented from exposure to sand and the associated abrasion of sand in a wellstream.

According to the invention the system comprises at least two collection vessels and means for flushing the sand out of at least one of the collection vessels, and the vessels and the means for flushing the sand out of said vessels are configured such that sand is flushed from one vessel while sand is collected in the other vessel.

With a system according to the invention sand is substantially continuously handled by the sand handling system as it may be collected and flushed at the same time, and these two activities may be done substantially continuously. There is also with such a system the possibility to have the flushing at intervals while at the same time collecting sand substantially continuously, in contradiction to known systems where the collection will have to be stopped while the flushing is performed or the collection unit is retrieved to the surface and replaced with another collection unit.

A system according to the invention would provide a continuous by-pass of sand, which will be preferred as this will give a more compact system. Another benefit is that online monitoring of sand production will be possible with such a system.

According to one aspect of the invention the system may comprise two collection vessels configured such that sand is collected in a first vessel, with connection means from the first vessel to a second collection vessel, for emptying of the sand from the first vessel to the second vessel, and the flushing means are arranged in connection with the second vessel. In one embodiment the first vessel may be arranged relatively above the second vessel, such that sand may be transferred through the connection means from the first vessel to the second vessel with the aid of gravity. There may in the connection means be a valve regulating the flow of sand between the two vessels. In another embodiment the connection means from the first to the second vessel may comprise a rotating ball valve comprising chambers for collected sand to be emptied from the first vessel to the second vessel. By rotating the ball valve an amount of sand is moved from one vessel to a second vessel, where it may be flushed from the system. In a third embodiment the first vessel may be arranged above the second vessel with a rotating ball valve comprising chambers in the connection between the two vessels. By rotating the ball valve, sand is moved from the first vessel to the second vessel and gravity will aid in removing sand from the chamber of the ball valve into the second vessel. The gravity will also aid in filling up the chamber of the ball valve present in the first vessel. The chambers of the ball valve may in one embodiment form a substantial part of the vessels, as for instance up to half the volume of the vessels, or more than half the volume of the vessels, or possible the full volume of the vessels.

According to another aspect of the invention, the system may comprise two collection vessels, where the vessels and a connection between the vessels and the inlet of the system are so configured that sand is alternately collected in the first and the second vessels and the flushing means are so configured that sand is flushed from a vessel when it is not collecting sand. Sand is with this system also substantially continuously collected as with the system according to the first embodiment of the invention. With such a system one may still have one flushing system, but this flushing system may be connected to both vessels.

According to one embodiment of the invention, the connection between the inlet and the vessels may comprise one three-way valve, connecting both vessels to the inlet of the system and regulating the flow of fluid from a de-sanding unit towards the vessels. This provides the possibility to regulate which of the vessels collects sand, and the collection of sand is done without interruptions.

According to an aspect of the invention, the flushing system may comprise connections to both vessels and valves for regulating the flushing of the separate vessels. There may with such a system be one flushing system operating both vessels. According to another aspect the vessels may be arranged to be rotatable about an axis, to thereby in one position be in connection with the de-sanding unit and in a second position be in connection with the flushing means. The vessels may by the rotation switch places and thereby either be connected to the de-sanding unit or be connected to the flushing system. Even with such a system the sand collection may be done substantially without interruptions.

According to another aspect of the invention, the system may comprise means for leading fluid from upstream and/or downstream of the rotating equipment into the flushing system to flush the vessels. The flushing system may comprise an ejector arranged to be driven with an active driving fluid taken from downstream of the pump, if the specific equipment is a pump. The second fluid in the flushing system with an ejector may for instance be taken from downstream or upstream of the pump. This fluid is driven through the vessel to be flushed by the high pressure fluid in the ejector, creating a suction. Thereby the sand is driven out of the vessels and downstream into the wellstream with the high pressure active driving fluid from the ejector system. The means for flushing sand from the tank does not form part of the invention and a skilled person would understand that there are many ways of achieving this.

According to the invention there is also provided a method for limiting abrasion of subsea rotating equipment. The method comprises separating at least a part of the sand in a wellstream from the wellstream, allowing the rest of the wellstream to continue towards the rotating equipment, collecting the separated sand in one of two collection units in a sand collecting system, and flushing the sand from one vessel into the wellstream downstream of the rotating equipment while sand is collected in the other vessel.

BRIEF DESCRIPTION OF THE DRAWINGS

The invention shall now be explained with non-limiting embodiments with reference to the attached drawing where.

DETAILED DESCRIPTION OF THE INVENTION

Figure 1:
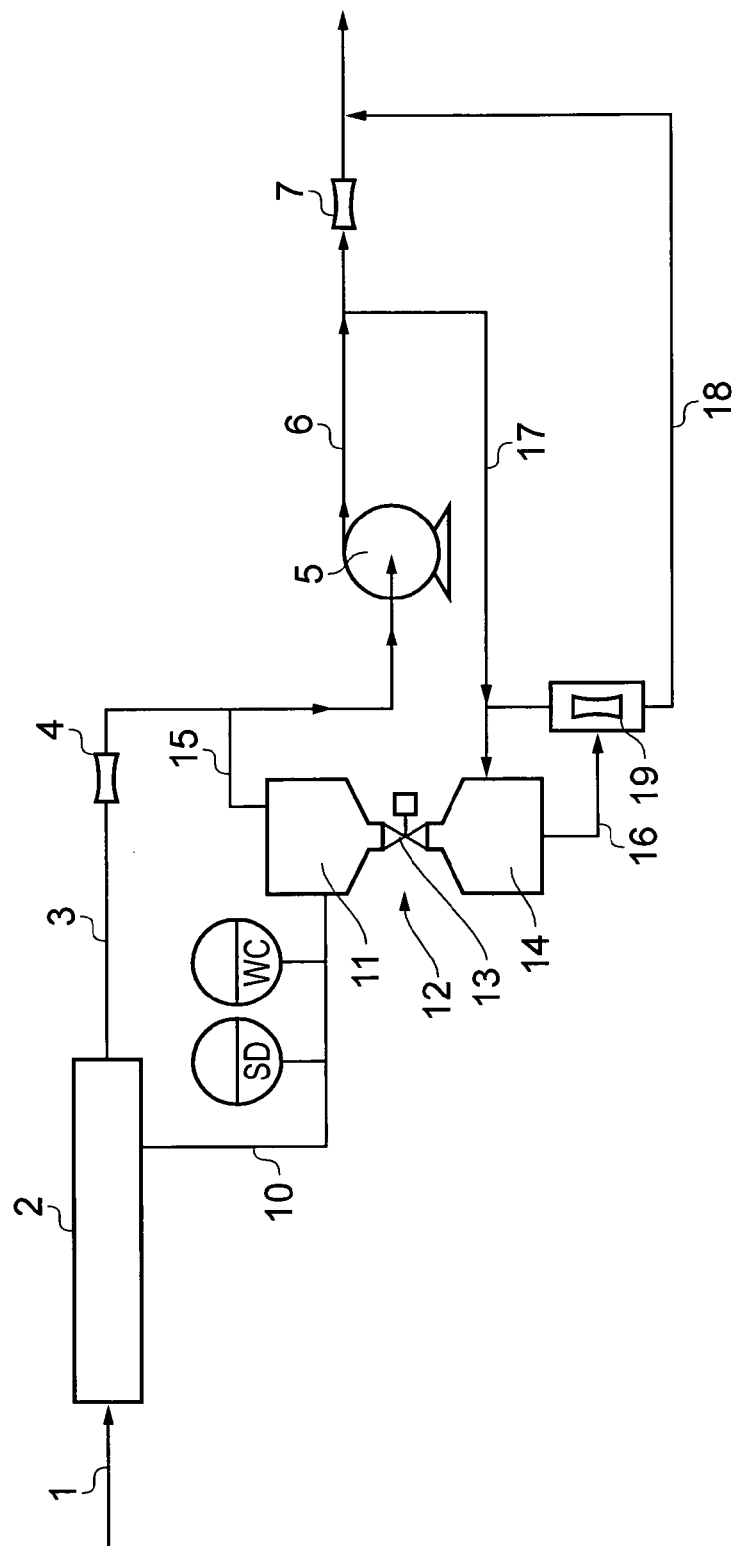
FIG. 1 shows a first embodiment of a system according to the invention

In FIG. 1 there is shown a pipeline 1 leading fluid from a well into a de-sander unit 2, Out of the de-sander unit 2 a de-sanded fluid is guided through a pipeline 3 and a restriction 4 in this pipeline 3 to a pump 5. Pressure is added to the fluid by the pump 5, and the fluid exists through pipeline 6, which also comprises a restriction 7. The sand separated out from the well fluid in the de-sander 2 is guided through a second outlet from the de-sander 2 to a pipeline forming the inlet 10 of the present invention. The pipeline 10 leads to a first vessel 11. Sand is collected from the de-sander unit 2 substantially without interruptions giving that the flow from the well is also without interruptions. The first vessel 11 is connected to a second vessel 14 through a connection 12. In this connection 12 there is arranged a valve 13. The first vessel 11 is in this embodiment arranged relatively vertically above the second vessel 14, such that when valve 13 is opened, the sand will due to gravity flow from the first vessel 11 to the second vessel 14. There is in addition a fluid line 15 leading from an upper part of the first vessel 11 to the fluid line 3 downstream of the first restriction 4 but upstream of the pump 5, for fluid separated from the sand in the first vessel 11. The second vessel 14 then has a sand inlet formed by the connection 12 and a sand outlet 16 leading to an ejector 19. In addition there is a second inlet connected to a pipeline 17, leading a fluid from the high pressure side of the pump into the second vessel 14 and also into the ejector 19. The high pressure fluid lead through pipeline 17 into the ejector will act as the active driving fluid in the ejector and create a suction pressure thereby drawing out fluid with sand from the second vessel 14 through sand outlet 16. From the ejector 17 the fluid containing the sand is guided through pipeline 18 to an inlet in the pipeline 6 downstream of the second restriction 7. This forms the flushing system of the first embodiment. There are also arranged suitable sensors in the system for operation of the different elements.

Figure 2:
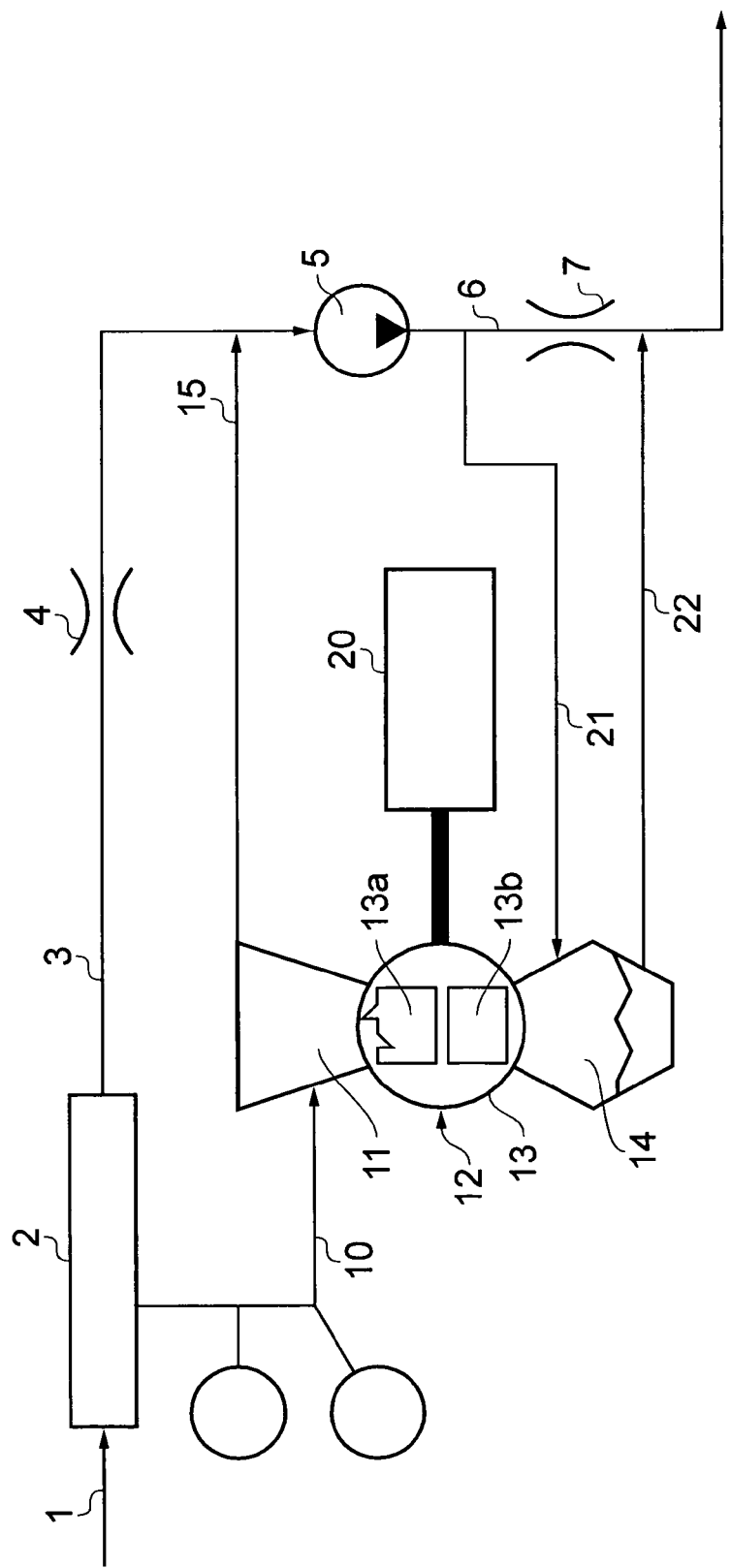
FIG. 2 shows a second embodiment.

In FIG. 2 there is shown a second embodiment of the invention. Similar elements to the first embodiment are given the same reference numerals, and it is referred to the explanation above. In this embodiment there is shown an actuator 20 for the operation of moving sand through the connection 12 between the first and second vessels 11, 14. In this embodiment there is shown a ball valve 13, with a first chamber 13a and a second chamber 13b. When the actuator 20 turns the ball valve 13 the chamber 13a is moved from the first vessel 11 into the second vessel 14 and there emptied of sand, and chamber 13b is moved from the second vessel 14 to the first vessel 1 to collect sand. Sand is thereby moved between the vessels. Sand in this embodiment is emptied from the second vessel 14 with fluid through a fluid line 21 leading to the second vessel from a point in the pipeline 6 downstream of the pump 5 but upstream the restriction 7, and is guided out of the second vessel through a sand outlet line 22 which leads to the pipeline 6 downstream of the second restriction 7. This forms the flushing system of the second embodiment.

Figure 3:
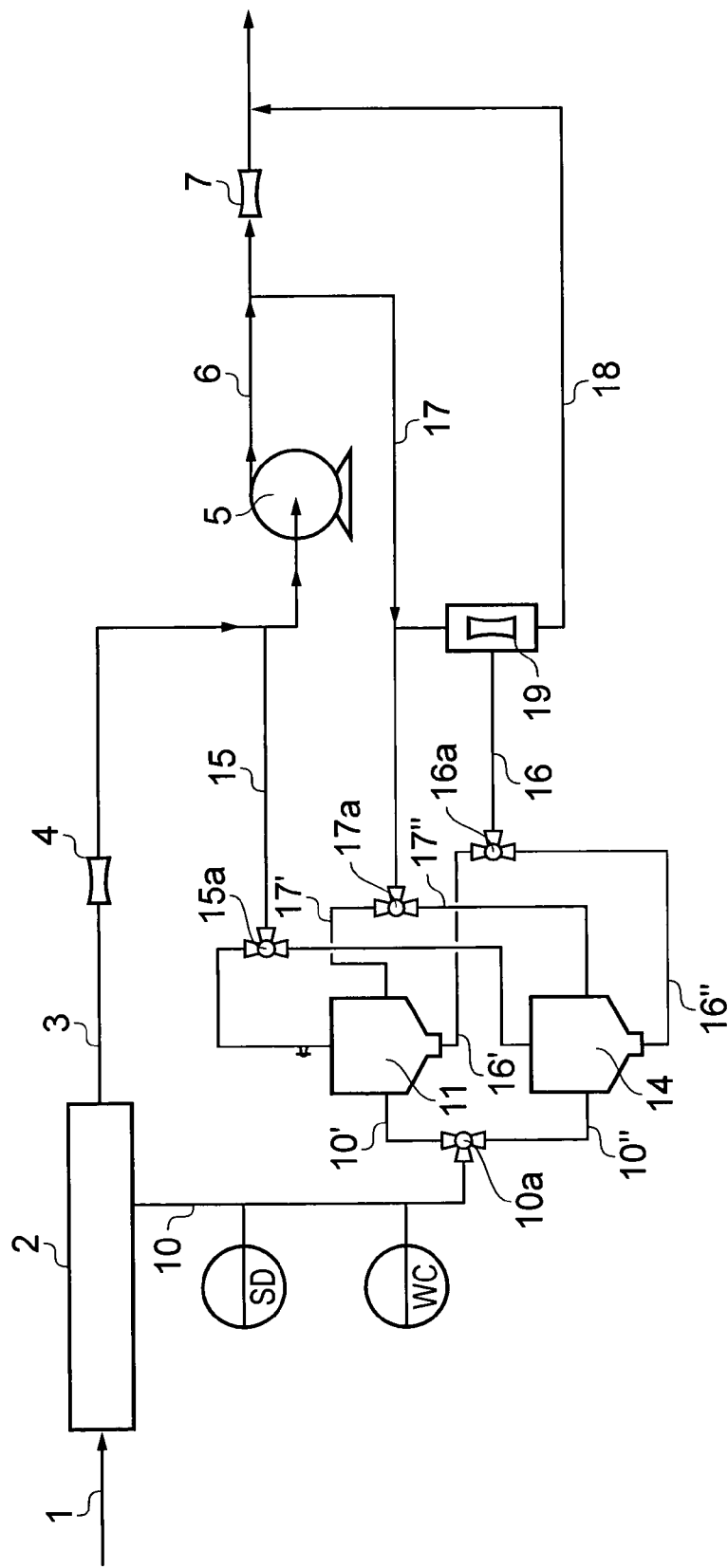
FIG. 3 shows a third embodiment.

In FIG. 3 there is shown a third embodiment of the invention. Similar elements are given same reference number as above, and it is referred to the explanation given. In this embodiment the pipeline 10 leading from the sand outlet of the de-sander 2 comprises a three-way valve 10a, a pipeline connection 10' leading to the first vessel 11, and a second pipeline connection 10" leading to the second vessel 14. By regulating the valve 10a, sand is collected substantially continuously and guided into the first or the second vessel, 11,14. Each of the vessels 11, 14 is connected to a flushing system with a pipeline 17 connected to the pipeline 6 downstream of the pump 5 but upstream of the second restriction 7. The pipeline 17 leads to an ejector 19 and also to a three-way valve 17a, which regulates the flow of fluid to either the first vessel 11 through a fluid connection 17' or the second vessel 14 through a second fluid connection 17". Both vessels 11,14 comprise an outlet connected through respective fluid connections 16',16" and a three-way valve 16a to a pipeline 16 leading to the ejector 19. The outlet of the ejector is guided through pipeline 18 into the pipeline 6 downstream of the second restriction 7. This forms the flushing system of the third embodiment. Both vessels 11,14 also have a fluid connection 15, which is connected through a three-way valve 15a between the upper part of the vessels and the pipeline 3, downstream of the restriction 4 but upstream of the pump 5. There are also arranged suitable sensors in the system.

The invention has now been explained with reference to three different embodiments. A skilled person would understand that there may be made alterations and modifications to these embodiments that are within the scope of the invention as defined in the attached claims. It is possible to combine features from the different embodiments, as for instance, a flushing system as described in relation to the first embodiment may be used with the second embodiment and the flushing system in the second embodiment may be used in the first and the third embodiment. One may omit the fluid connection between the upper part of the vessels and the pipeline upstream of the pump. The de-sander may be any kind of de-sander or even a separator separating the well fluid into oil, water, gas and sand or combinations of these different elements. The fluid used in the flushing system may be any of the three fluids separated in the separator, or a combination.

The invention claimed is:

1. A subsea sand handling system for limiting abrasion of specific subsea equipment, comprising:
   an inlet connectable to a sand outlet of a sand separation system located upstream of the specific equipment;
   an outlet connectable to a pipeline downstream of the specific equipment;
   at least two collection vessels connected between the inlet and the outlet; and
   means for flushing sand out of one of the collection vessels and into the outlet while at the same time sand passing through the inlet is collected in the other collection vessel;
   wherein at least a part of each vessel is configured to be rotatable about an axis, such that in one position one of the vessels is in connection with the sand separation system and in a second position that vessel is in connection with the flushing means.

2. The subsea sand handling system according to claim 1, wherein sand is collected in a first collection vessel, the flushing means is connected to a second collection vessel, and the system further comprises a connection between the first and second collection vessels through which sand from the first vessel is emptied into the second vessel.

3. The subsea sand handling system according to claim 2, wherein the first vessel is arranged relatively above the second vessel such that sand may be transferred through the connection from the first vessel to the second vessel with the aid of gravity.

4. The subsea sand handling system according to claim 3, wherein the connection comprises a rotating ball valve comprising chambers for collecting sand to be emptied from the first vessel to the second vessel.

5. The subsea sand handling system according to claim 1, wherein a connection between the vessels and the inlet is so configured that sand is alternately collected in the first and the second vessels; and wherein the flushing means is so configured that sand is flushed from the vessels when the vessel is not collecting sand.

6. The subsea sand handling system according to claim 5, wherein the flushing means comprises respective connections to both vessels and valves positioned in said connections for regulating the flushing of the separate vessels.

7. The subsea sand handling system according to claim 1, further comprising means for leading fluid from downstream of the specific equipment into the flushing means to flush the vessels.

8. A subsea sand handling system for use in connection with a subsea system component, the sand handling system comprising:
   an inlet which is connected to a sand outlet of a sand separation system located upstream of the component;
   an outlet which is connected to a pipeline located downstream of the component; and
   at least two collection vessels which are connected between the inlet and the outlet;
   wherein in operation of the sand handling system sand from the sand separation system is conveyed through the inlet into one of the collection vessels while at the same time sand in the other of the collection vessels is conveyed through the outlet and into the pipeline;
   wherein the inlet is connected to a first of the collection vessel, the outlet is connected to a second of the collection vessels, and the system further comprises a connection member which connects the first vessel to the second vessel and through which sand in the first vessel is transferred into the second vessel.

9. The subsea sand handling system of claim 8, wherein the first vessel is positioned vertically above the second vessel and the sand is transferred through the connection member with the aid of gravity.

10. The subsea sand handling system of claim 9, wherein the connection member comprises a rotating ball valve which includes at least one chamber in which sand in the first vessel is collected, and wherein upon rotation of the ball valve the sand in the first chamber is deposited into the second vessel.

11. The subsea sand handling system of claim 8, further comprising:
    a fluid line which is connected between the second collection vessel and the pipeline at a location upstream of the outlet;
    wherein in operation of the sand handling system sand from the sand separation system is conveyed through the inlet into the first vessel while at the same time fluid in the pipeline downstream of the component is conveyed through the fluid line and the second vessel to thereby flush sand from the second vessel into the outlet.

12. The subsea sand handling system of claim 11, further comprising an ejector which is positioned in the outlet and is operated by fluid conveyed through the fluid line.

13. The subsea sand handling system of claim 8, wherein both a first and second of the vessels are connected to the inlet through a first three-way valve and both the first and second vessels are connected to the outlet through a second three-way valve, and wherein in operation of the sand handling system sand is alternately conveyed through the inlet into one of the first and second vessels while at the same time sand is conveyed through the outlet from the other of the first and second vessels.

14. The subsea sand handling system of claim 13, further comprising:

a fluid line which is connected on one end to both the first and second vessels through a third three-way valve and on the other end to the pipeline at a location upstream of the outlet;

wherein while sand is conveyed through the inlet into one of the first and second vessels, fluid is conveyed through the fluid line and the other of the first and second vessels to thereby flush sand from said vessel into the outlet.

15. The subsea sand handling system of claim 14, further comprising an ejector which is positioned in the outlet and is operated by fluid conveyed through the fluid line.

* * * * *